Patented Sept. 18, 1945

2,385,266

UNITED STATES PATENT OFFICE 2,385,266

PROCESS FOR THE PRODUCTION OF ERYTHRINA ALKALOIDS

Karl Folkers, Plainfield, and Randolph T. Major, Mountainside, N. J., assignors to Merck & Co., Inc., Rahway, N. J., a corporation of New Jersey No Drawing. Application November 13, 1942, Serial No. 465,460

6 Claims. (Cl. 260—236)

This invention relates to a physiologically active alkaloid, and to processes for its production.

The alkaloid of the present invention exhibits a potent curare-like action, and is particularly useful for the release of spasm and plastic muscular rigidity in patients afflicted with spastic paralysis, and for modification of the severity of metrazol convulsions, thereby preventing fracture in the convulsive therapy of the psychoses.

Our new alkaloid may be produced from seeds or plant parts of species of Erythrina. When such seeds or plant parts are extracted with water, alcohol, etc. (after removal of fats), a crude extract is obtained, which exhibits high paralysis potency. When an aqueous solution of that fraction is made slightly or weakly alkaline, and extracted with a solvent immiscible in water, such as chloroform, an active alkaloidal fraction is obtained which has been called the "free" alkaloidal fraction.

After the "free" alkaloidal fraction had been produced, it was discovered, surprisingly, that other new alkaloids of different type could also be produced from Erythrina species. We have called these last-named alkaloids the "combined" alkaloids because they are combined with an acid through an ester linkage. These new "combined" alkaloids appear to be esters of sulfoacetic acid, $HO_3SCH_2CO_2H$, and still other new alkaloidal molecules. This is evidenced by the fact that acid or alkaline hydrolysis of the new "combined" alkaloids yields two fragments in each instance, the sulfoacetic acid and an alkaloidal portion which we have called the "liberated" alkaloid.

To our knowledge, such "combined" alkaloids are without parallel in alkaloid chemistry.

These new alkaloidal esters of sulfoacetic acid also exhibit the physiological action of curare, and likewise possess the valuable property of forming soluble sodium salts, which renders them suitable for injection in that form.

The "free" fraction may be produced from seeds or plant parts of the Erythrina species. One process for its production may involve the following general steps described with particular reference to seeds as starting materials:

1. Treatment of the seeds to remove fats;
2. Extraction of the total alkaloids with a solvent such as methyl or ethyl alcohol;
3. Removal of the solvent, and dissolving of the residue in water;
4. Clarification of the aqueous solution by weakly acidifying and extracting with petroleum ether and then with chloroform, to remove traces of fats;
5. Alkalinization of the clarified aqueous solution with a weak alkalinizing agent;
6. Extraction of the weakly or slightly alkalinized aqueous solution with chloroform, which selectively removes the "free" alkaloidal fraction and thus separates the "free" and "combined" fractions.

Certain variations may be practiced in carrying out the invention. Thus, for example (a) Step 1 may be omitted, and the fats removed at step 4 of the process;

(b) Water may be utilized for extraction step 2, in which event step 3 may be omitted.

(c) The alkaloid, hypaphorine, which may also be obtained from species of Erythrina may be produced before producing the physiologically active alkaloids, by acidifying the clarified aqueous solution remaining after step 4, concentrating to small volume, and refrigerating, whereupon a hypaphorine salt crystallizes out. Since the "combined" alkaloids may be hydrolyzed to "liberated" alkaloids by acid, the acid treatment for production of the hypaphorine salt should be carried out as rapidly as possible, in order that the "free" fraction may be produced selectively on further working up of the extract as previously described.

(d) In treating the bark of roots, stems, or flowers, the resinous substances may be separated out together with the alkaloidal material, by extracting such starting materials directly with methyl alcohol or ethyl alcohol. On treatment with acidulated water, the resinous substances are separated from the alkaloidal material, and may be removed by concentration and filtration.

The "free" alkaloidal fraction obtained according to the above-described procedures may comprise substantially preponderantly the "free" individual alkaloidal substance which we have called "erythroidine," or may comprise several "free" individual alkaloids in varying proportions. In addition to our alkaloidal substance, "erythroidine," we have also produced several other individual "free" alkaloids which we have called erythraline, erythramine, and erythratine, respectively. Hereinafter in the specification and claims, where the term "free fraction" is used it is intended to define the chloroform-soluble fraction of Erythrina alkaloids.

In the case of those Erythrina species, such as E. americana, E. berteroana, and E. Poeppigiana, for example, where the "free" fraction comprises substantially preponderantly our "erythroidine," that product is directly obtained by the process outlined above. Thus the product obtained at step 6 of the process described, would be "erythroidine." It may be recovered directly as the base, or may be recovered in the form of an acid salt or hydrohalide by dissolving the base in an organic solvent such as methyl or ethyl alcohol, for instance, treating with an agent adapted to produce the desired acid salt or hydrohalide, and recovering the precipitated product.

However, where the "free" fraction comprises one or more other "free" individual alkaloids, in addition to "erythroidine," it may be desirable to subject the fraction to special treatment for the selective production of any one of the "free" individual alkaloids. Thus, in the case of a species of Erythrina such as *E. costaricensis*, for example, the "free" alkaloidal fraction obtained therefrom may be treated with strong alkali solution to cause a rupture of the lactone ring in "erythroidine," and form the alkali salt of the resulting acid, thus rendering the alkaloid insoluble in the usual organic solvents. The remaining "free" alkaloids which comprise the "free" fraction are unaffected by the treatment with strong alkali, and may be recovered by extracting the alkaline solution with a water-immiscible organic solvent, such as chloroform. After production of the unaffected "free" alkaloids, the lactone ring of "erythroidine" may be reformed by acidifying the alkaline solution, and refluxing, or by permitting the acidified solution to stand for some time. Upon acidification, the salt or hydrohalide of "erythroidine" corresponding to the acidifying agent employed, may be recovered by weakly alkalinizing the solution, as by treatment thereof with sodium bicarbonate, and extracting the weakly alkaline solution with a solvent such as chloroform.

Our "erythroidine" is a crystalline material, has the empirical formula $C_{16}H_{19}NO_3$, is a lactone which is susceptible to destruction by strong alkali, forms a crystalline hydrochloride melting at around 232° C., usually in the range of 223–232° C., and is a mixture of stereoisomers. The term "erythroidine" as used hereinafter in the specification and claims is intended to define this lactone.

Previously, Altamirano has reported the production of a crude extract from a species of Erythrina which he called *E. coralloides* (Gaceta Medica de Mexico, vol. 23, No. 18, pp. 369–92, 1888). The Altamirano paper does not reveal any characterizing data by which the species of Erythrina with which he worked can be identified and classified, and it is impossible to determine the plant upon which his reported experiments were carried out. He reports that he produced a crystalline alkaloid from *E. coralloides* which he called coralloidine, but that such crystalline alkaloid was not a motor-paralyzing principle. Altamirano also reports his experiments on the mother liquors of his coralloidine extraction, but the experiments are not described in detail, no quantities of reagents, temperature conditions, or the like, being given. Altamirano states that from the mother liquors of his coralloidine extraction, he obtained a mixture of substances containing, among others, a small quantity of a material which he called erythroidine because it appeared to be different from the substance which he had called coralloidine.

It is impossible to repeat the experiments of Altamirano, due to the paucity of details given, and the fact that he has not identified the species of Erythrina with which he worked, and, therefore, it is impossible to identify the substance which he reports that he obtained in admixture with resinous and other foreign materials. That it is not the alkaloid which we have called "erythroidine" is clear, in the light of the brief discussion of his process given by Altamirano. For example, Altamirano states that in order to isolate his alkaloid from the crude extract, he utilized potassium hydroxide. He states that the extract was dissolved in water, alkalinized with potash solution, mixed with sulfuric ether, and agitated. He reports that in this way he isolated 0.52 gram of a substance, which he describes as follows: "colorless when fresh, but after having been exposed to the action of air for some time, changes to a red color; has a special odor, and a definitely alkaline action soluble in water, giving it a milky appearance, deliquescent, amorphous; did not form the prismatic crystals of coralloidine with hydrochloric acid."

Our alkaloid "erythroidine" is distinguished from the substance described by Altamirano, nor could our "erythroidine" be obtained by the generalized processes described by him. Thus, in aqueous solution our alkaloid, "erythroidine," is progressively hydrolyzed in the presence of potassium hydroxide, and, furthermore, it is sparingly soluble in ether. Also, it forms a crystalline hydrochloride.

Altamirano further reports that he mixed "colorin powder" with slaked lime, and that, after further treatment, he obtained an impure sulfate of the material he called erythroidine. Our new alkaloid which we called "erythroidine" is susceptible to destruction by strong alkalies, such as slaked lime.

In view of the difficulty encountered in attempting to follow the experimental data given by Altamirano, we have attempted to produce our alkaloid "erythroidine" from *Erythrina coralloides* DC. according to the method which we have found effective for its production from other Erythrina species. We have been unable to obtain our alkaloid "erythroidine" from *E. coralloides* DC. by such processes.

The following examples illustrate methods of carrying out the present invention, but it is to be understood that these examples are given by way of illustration and not of limitation.

*Example I*

About 1025 gms. of ground seed (40 mesh) of *E. americana* were extracted in a Soxhlet apparatus with ether or petroleum ether to remove fatty oils. The solvent was distilled. About 125 gms. of oil were removed. Traces of alkaloidal material may be recovered from this oil by treatment with dilute acid, etc. The ground seeds were then exhaustively extracted with a solvent such as ethanol. The ethanol extract was distilled, finally in vacuo. A residue of about 175 gms. remained. This was dissolved in one liter of water, acidulated with about 20 ml. of concentrated hydrochloric acid, and extracted with an immiscible solvent to remove the residual suspended fatty oil droplets. The clarified solution was then concentrated in vacuo until the hypaphorine salt crystallized. The yield of that salt was about 25.8 gms.; the hydrochloride melted at about 230–231° C., with decomposition (uncorr.). The moth liquor was alkalinized with an aqueous solution of sodium bicarbonate, and exhaustively extracted with chloroform, and the solvent was distilled off in vacuo. About 14 gms. of the base "erythroidine" remained.

The base may be dissolved in absolute alcohol and treated with an agent for the production of a salt thereof. When it was treated with dry hydrogen chloride in absolute alcohol, the hydrochloride was precipitated. On standing, "erythroidine" hydrochloride crystallized, in a yield of about 7.6 gms. It occurred in the form of white needles melting at about 228° C., with decomposition (uncorr.).

By treating the base with other acidifying agents, other salts may be produced.

Example II

The physiologically active "free" alkaloidal fraction from seeds, dried flowers, etc., of *E. berteroana* was dissolved in one part of absolute ethanol, and treated with the calculated quantity (on the basis of a molecular weight of 273 for the stereoisomeric mixture "erythroidine") of dry hydrogen chloride in absolute ethanol. Crystallization of quite pure "erythroidine," the stereoisomeric mixture, took place on standing. Absolute ether may be added to the warm solution, for an improved yield. The hydrochloride of "erythroidine" was recrystallized until analytically pure. The melting point was usually in the range of 223° to 232° C., with decomposition.

Example III

The "free" alkaloidal fraction from *E. berteroana* (#9193) was treated according to Example II, for the production of the hydrochloride of the stereoisomeric mixture, "erythroidine."

Example IV

The "free" alkaloidal fraction from *E. Poeppigiana* was treated according to the process described in Example II, for the production of the hydrochloride of the stereoisomeric mixture, "erythroidine."

Example V

The "free" alkaloidal fraction from seeds of *E. berteroana* was dissolved in absolute ethanol, and treated with the calculated quantity of 40% hydrobromic acid solution. The hydrobromide of the stereoisomeric mixture, "erythroidine," crystallized in the form of needles melting at about 223° C. to 224° C. It contains one-half molecule of ethanol of crystallization.

Example VI

The "free" alkaloidal fraction from dried flowers of *E. berteroana* was dissolved in absolute ethanol. The calculated quantity of sodium iodide was then dissolved in the solution, after which the calculated quantity of glacial acetic acid was added. The hydroiodide of the stereoisomeric mixture, "erythroidine," crystallized out. Melting point, 218° to 220° C., with decomposition.

Example VII

The "free" alkaloidal fraction from dried flowers of *E. berteroana* was dissolved in absolute ethanol, and the solution treated with the calculated quantity of picrolonic acid dissolved in absolute ethanol. The yellow-colored picrolonate of the stereoisomeric mixture, "erythroidine," crystallized out. Melting point about 215.5° to 216° C.

Example VIII

The "free" alkaloidal fraction from dried flowers of *E. berteroana* was dissolved in absolute ethanol, and treated with the calculated quantity of flavianic acid dissolved in absolute ethanol. The flavianate of the stereoisomeric mixture, "erythroidine," precipitated. The crystalline material melted at about 165° to 170° C., with decomposition.

Example IX

About 677 gms. of finely powdered seeds of *E. costaricensis*, Niehaus 9364, were extracted continuously for six hours with petroleum ether. The ether extract was concentrated to dryness, yielding about 89.8 gms. of an oily residue. The defatted material was then extracted continuously with methanol for 50 hours. The methanolic extract was concentrated to dryness in vacuo, and yielded 107.2 gms. of a dry residue. The dry residue was dissolved in 600 mls. of water, and acidified by the addition of 12 mls. of concentrated hydrochloric acid. The acidified solution was extracted five times with 50 ml. portions of petroleum ether, and then extracted five times with 25 ml. portions of chloroform to remove residual particles of fatty material. The remaining clear acid solution was cooled in an ice bath to about 10° C., and then neutralized and made alkaline to pH 8.0 with solid sodium bicarbonate. The alkalinized material was extracted 11 times with 25 ml. portions of chloroform. The chloroform was removed from the extracts, in vacuo, and 2.4 gms. of gummy residue were obtained.

The residue comprised a mixture of alkaloids, which were separated as follows:

The gum was dissolved in the minimum amount of alcohol, and 125 mls. of 5% aqueous sodium hydroxide was added. The solution was refluxed for one hour, cooled, and extracted 10 times with 25 ml. portions of chloroform. The chloroform extracts were concentrated to dryness. 0.86 gm. of gum was obtained. The remaining aqueous alkaline solution was acidified to pH 2.3 with concentrated hydrochloric acid, and refluxed for one hour. The solution was cooled, and made alkaline to pH 8.0 with sodium bicarbonate. The alkaline solution was extracted 10 times with 25 ml. portions of chloroform. 1.13 gms. of "erythroidine" were obtained, after removal of the solvent in vacuo. It was converted to its hydrochloride.

Modifications may be made in carrying out the present invention, without departing from the spirit and scope thereof, and we are to be limited only by the appended claims.

This is a continuation-in-part of our application Serial No. 233,412, filed October 5, 1938.

We claim:

1. The process comprising treating an organic solvent solution of the "free" fraction from species of Erythrina containing preponderant quantities of the alkaloidal substance, "erythroidine," a stereoisomeric mixture of formula $C_{16}H_{19}NO_3$, with an acidulating agent, and separating the acid salt of said "erythroidine."

2. The process comprising treating a lower aliphatic alcohol solution of the "free" fraction from species of Erythrina containing preponderant quantities of the alkaloidal substance, "erythroidine," a stereoisomeric mixture of formula $C_{16}H_{19}NO_3$, with an acidulating agent, and separating the acid salt of said "erythroidine."

3. The process comprising treating an organic solvent solution of the "free" fraction from species of Erythrina containing preponderant quantities of the alkaloidal substance, "erythroidine," a stereoisomeric mixture of formula $C_{16}H_{19}NO_3$, with hydrochloric acid, and separating the hydrochloride of said "erythroidine."

4. The process comprising treating a lower aliphatic alcohol solution of the "free" fraction from species of Erythrina containing preponderant quantities of the alkaloidal substance, "erythroidine," a stereoisomeric mixture of formula $C_{16}H_{19}NO_3$, with hydrochloric acid, and separating the hydrochloride of said "erythroidine."

5. The process comprising treating a lower aliphatic alcohol solution of the "free" fraction from species of Erythrina containing preponderant quantities of the alkaloidal substance, "erythroidine," a stereoisomeric mixture of formula $C_{16}H_{19}NO_3$, with hydrobromic acid, and separating the hydrobromide of said "erythroidine."

6. The process comprising treating a lower aliphatic alcohol solution of the "free" fraction from species of Erythrina containing preponderant quantities of the alkaloidal substance, "erythroidine," a stereoisomeric mixture of formula $C_{16}H_{19}NO_3$, with hydrogen iodide, and separating the hydriodide of said "erythroidine."

KARL FOLKERS.
RANDOLPH T. MAJOR.